United States Patent
Geitz et al.

(10) Patent No.: US 11,800,366 B2
(45) Date of Patent: Oct. 24, 2023

(54) METHOD FOR ALLOCATING A SPECTRAL RESOURCE OF A RADIO CELL USING AN EDGE CLOUD SERVER

(71) Applicant: Deutsche Telekom AG, Bonn (DE)

(72) Inventors: Marc Geitz, Hagen (DE); Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 203 days.

(21) Appl. No.: 17/506,719

(22) Filed: Oct. 21, 2021

(65) Prior Publication Data
US 2022/0124508 A1    Apr. 21, 2022

(30) Foreign Application Priority Data

Oct. 21, 2020   (EP) ..................................... 20203122

(51) Int. Cl.
| | |
|---|---|
| *H04W 16/10* | (2009.01) |
| *H04W 28/16* | (2009.01) |
| *H04W 72/044* | (2023.01) |
| *H04W 72/12* | (2023.01) |
| *H04W 72/542* | (2023.01) |

(52) U.S. Cl.
CPC ........... *H04W 16/10* (2013.01); *H04W 28/16* (2013.01); *H04W 72/044* (2013.01); *H04W 72/12* (2013.01); *H04W 72/542* (2023.01)

(58) Field of Classification Search
CPC ... H04W 16/10; H04W 72/542; H04W 28/16; H04W 72/044; H04W 72/12
See application file for complete search history.

(56) References Cited

U.S. PATENT DOCUMENTS

| | | | | |
|---|---|---|---|---|
| 9,652,129 | B1* | 5/2017 | Caballero | ............... G06F 9/452 |
| 2012/0220263 | A1* | 8/2012 | Smith | ..................... H04W 4/60 |
| | | | | 455/410 |

(Continued)

OTHER PUBLICATIONS

Cunzhuo Zhao, et al., "Mobile Edge Computing Meets mmWave Communications: Joint Beamforming and Resource Allocation for System Delay Minimization", IEEE Transactions on Wireless Communications, Apr. 2020, pp. 2382-2396, vol. 19, No. 4, IEEE, Piscataway, New Jersey, USA.

(Continued)

*Primary Examiner* — Ajay Cattungal
(74) *Attorney, Agent, or Firm* — LEYDIG, VOIT & MAYER, LTD.

(57) ABSTRACT

A method for allocating a spectral resource of a radio cell of a mobile communication network to a mobile application includes: establishing, by the mobile application, a wireless connection to an application backend via a radio access point of the radio cell of the mobile communication network; and allocating, by a scheduler of the mobile communication network, the spectral resource of the radio cell to the established wireless connection. An optimization service requested by the scheduler determines a minimum of an overall cost function, the overall cost function summing a plurality of cost values, wherein each cost value is related to a respective mobile application connected to the radio access point. The scheduler allocates the spectral resource depending on the determined minimum of the overall cost function.

15 Claims, 1 Drawing Sheet

(56) References Cited

U.S. PATENT DOCUMENTS

| | | | |
|---|---|---|---|
| 2013/0268485 A1* | 10/2013 | Cao | G06F 16/21 |
| | | | 707/722 |
| 2015/0067030 A1* | 3/2015 | Smith | H04L 67/04 |
| | | | 709/203 |
| 2017/0192765 A1* | 7/2017 | Smith | G06F 9/45558 |
| 2017/0277891 A1* | 9/2017 | Keppler | H04L 63/1491 |
| 2017/0295181 A1* | 10/2017 | Parimi | H04L 63/1433 |
| 2017/0322934 A1* | 11/2017 | Chen | G06F 9/50 |
| 2022/0156809 A1* | 5/2022 | Deng | G06F 9/5027 |

OTHER PUBLICATIONS

Jinke Ren, et al., "Latency Optimization for Resource Allocation in Mobile-Edge Computation Offloading", arXiv:1704.00163, Apr. 1, 2017, pp. 1-30, version 1, Cornell University, Ithaca, New Yok, USA.

\* cited by examiner

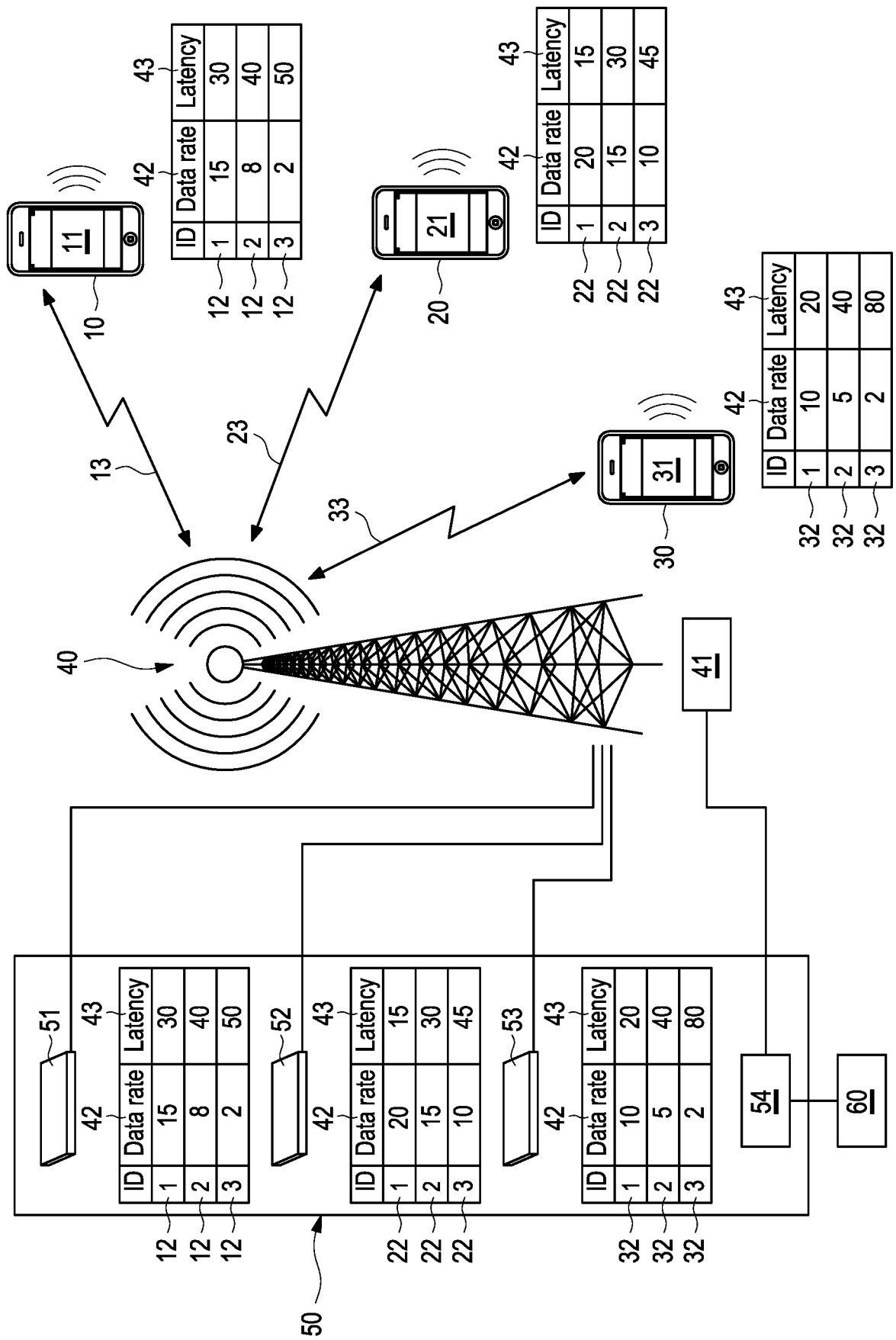

METHOD FOR ALLOCATING A SPECTRAL RESOURCE OF A RADIO CELL USING AN EDGE CLOUD SERVER

CROSS-REFERENCE TO PRIOR APPLICATIONS

This application claims benefit to European Patent Application No. EP 20 203 122.5, filed on Oct. 21, 2020, which is hereby incorporated by reference herein.

FIELD

The invention relates to a method for allocating a spectral resource of a radio cell of a mobile communication network to a mobile application, comprising the steps: a mobile application establishes a wireless connection to an application backend via a radio access point of a radio cell of a mobile communication network; and a scheduler of the mobile communication network allocates a spectral resource of the radio cell to the established wireless connection. The invention further relates to an edge cloud server and a computer program product.

BACKGROUND

Methods for allocating a spectral resource of a radio cell of a mobile communication network to a mobile application are known in prior art and are widely used for providing mobile applications being executed by mobile devices (user equipment, UE) and connecting to a radio access point, e.g. a Long Term Evolution (LTE) base station or a 4G/5G nodeB, of the radio cell with spectral resources of the radio cell allowing for a normal operation of the mobile applications.

In contrast, methods for allocating computational resources to distributed applications comprising a mobile application and an application backend are also known.

The article "Mobile Edge Computing Meets mmWave Communications: Joint Beamforming and Resource Allocation for System Delay Minimization" by Zhao et al., IEEE Transactions on wireless communications, vol. 19, No. 4 Apr. 2020, discloses a method for partitioning a computational task and assigning respective parts of the computational task to a mobile application and an application backend dependent of a bandwidth allocated by a communication network to a wireless connection established by the mobile application to the application backend.

The draft article "Latency Optimization for Resource Allocation in Mobile-Edge Computation Offloading" by Ren et al., Apr. 4 2017, discloses a similar method additionally taking into account a variance of a white Gaussian noise and involving a video compression.

Allocation of spectral resources is usually carried out by a scheduler which is a special service provided by a mobile network operator (MNO) and associated to the radio access point of the radio cell.

However, on the one hand, a spectral capacity, e.g. an amount of available spectral resources, of the radio cell is limited. On the other hand, a number of mobile applications being connected to the radio access point is generally very large and spectral requirements of the mobile applications may vary strongly both among different mobile applications and, due to changing operational modes and environmental conditions, during a wireless connection of a particular mobile application. Hence, an amount of spectral resources required by the mobile applications is very volatile.

As a consequence, the radio cell may be easily overloaded or the spectral resource allocated to the mobile application may be easily insufficient or oversized for a normal operation of the mobile application.

SUMMARY

In an exemplary embodiment, the present invention provides a method for allocating a spectral resource of a radio cell of a mobile communication network to a mobile application. The method includes: establishing, by the mobile application, a wireless connection to an application backend via a radio access point of the radio cell of the mobile communication network; and allocating, by a scheduler of the mobile communication network, the spectral resource of the radio cell to the established wireless connection. An optimization service requested by the scheduler determines a minimum of an overall cost function, the overall cost function summing a plurality of cost values, wherein each cost value is related to a respective mobile application connected to the radio access point. The scheduler allocates the spectral resource depending on the determined minimum of the overall cost function.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows a system comprising an edge cloud server according to an embodiment of the invention.

DETAILED DESCRIPTION

Exemplary embodiments of the invention provide a method for allocating a spectral resource of a radio cell of a mobile communication network to a mobile application which allows for an optimal distribution of spectral resources of the radio cell among a plurality of mobile applications being connected to the radio cell. Exemplary embodiments of the invention further provide an edge cloud server and a computer program product.

A first aspect of the invention is a method for allocating a spectral resource of a radio cell of a mobile communication network to a mobile application, comprising the steps: a mobile application establishes a wireless connection to an application backend via a radio access point of a radio cell of a mobile communication network; and a scheduler of the mobile communication network allocates a spectral resource of the radio cell to the established wireless connection. The scheduler distributes spectral resources of the radio cell among mobile applications being connected to the radio access point, e.g. an LTE base station or a 4G/5G nodeB, of the radio cell.

In a further embodiment, the method comprises the further steps: an optimization service being requested by the scheduler determines a minimum of an overall cost function of the radio cell, the overall cost function summing a plurality of cost values each cost value being related to a mobile application being connected to the radio access point; and the scheduler allocates the spectral resource depending on the determined minimum of the overall cost function. The scheduler requests a solution of an optimization problem and receives the requested solution from the optimization service wherein the optimization problem comprises determining a minimum of the overall cost function. The overall cost function reflects an actual total spectral load of the radio cell by taking into account a cost value for each mobile application being connected to the radio cell. An optimal configuration of the radio cell, e.g. adequate allocations of spectral resources of the radio cell to a plurality of mobile applications being connected the radio cell is determined by a solution of the optimization problem, i.e. a minimum of the overall cost function of the mobile applications.

A cost value $C_i$ related to a mobile application i being connected to the radio cell is given by $$C_i = \Sigma_j C_{ij} x_{ij},$$

wherein $C_{ij}$ is a cost value related to the operational mode j of the application i and $x_{ij} \in \{0,1\}$ is a binary Qbit variable indicating whether the application i is in the operational mode j ($x_{ij}=1$) or not ($x_{ij}=0$). While $C_{ij}$ is a constant with respect to time the cost value $C_i$ will generally vary with respect to time as the application i may change its operational mode j over time, e.g. $C_i$ is time-dependent as is $x_{ij}$.

Accordingly, the time-dependent minimum of the overall cost function is defined as $$\min(\Sigma_i \Sigma_j C_{ij} x_{ij}),$$

e.g. as a minimized sum over all applications i being connected to the radio access point of the radio cell wherein the determined minimum preferably is a global minimum of the overall cost function.

In a preferred embodiment, a minimum data rate and/or a maximum latency for uplink and downlink, respectively, are allocated as the spectral resource. Allocating a minimum data rate to the wireless connection prevents the wireless connection from being too narrow while allocating a maximum latency to the wireless connection prevents the wireless connection from being too delayed with respect to the requirements of the mobile application for a normal operation. A cost value of a higher minimum data rate is higher than a cost value of a lower minimum data rate and a cost value of a lower maximum latency is higher than a cost value of a higher maximum latency. It is noted that each application has to transmit its operational modes, respectively the corresponding spectral requirements, to the scheduler which maps the transmitted operational modes to cost values and forwards the cost values to the optimization service.

In another preferred embodiment, a predetermined combination of a minimum data rate and a maximum latency for uplink and downlink, respectively, is allocated as the spectral resource. A specification of a radio communication protocol may define a plurality of predetermined combinations of minimum data rate values and maximum latency values. The predetermined combinations may cover a range from a practical non-availability to an ideal availability of a data rate and/or latency and may prefer either the data rate or the latency between the non-availability and the ideal availability. A predetermined configuration may also be referred to as an operating mode of the mobile application or the radio access network.

In an advantageous embodiment, determining the minimum comprises taking into account at least one equality constraint. The equality constraint reduces a space of possible minima of the overall cost function. In other words, the equality constraint excludes useless and unwanted minima from the solution space of the optimization problem.

A spectral capacity of the radio cell may be taken into account as the at least one equality constraint. The spectral capacity may be represented as a cost value $C_{max}$ reflecting the maximum available spectral resource of the radio cell. The scheduler does not allocate more spectral resources than are provided by the radio cell. Accordingly, the spectral capacity equality constraint reads $$\left(\Sigma_i \Sigma_j C_{ij} x_{ij} + \frac{a}{A} C_{max} - C_{max}\right)^2,$$

wherein $C_{max}$ is the cost value of the spectral capacity. The spectral capacity equality constraint is squared in order to ensure a positive contribution both in case the spectral capacity is exceeded and in case the spectral capacity is fallen short of. The variable a is a so-called slack variable indicating a difference by which the actual overall cost value caused by the mobile applications differs from the spectral capacity cost value of the radio cell. A range of the variable a is from 0 to a scaling constant A causing a range of a/A to be from 0 to 1. Introducing a binary representation of the slack variable a $$a = \Sigma_k 2^k a_k,$$

wherein $a_k \in \{0,1\}$ is also a binary Qbit variable, yields $$\left(\Sigma_i \Sigma_j C_{ij} x_{ij} + \frac{C_{max}}{A} \Sigma_k 2^k a_k - C_{max}\right)^2.$$

For instance, the scaling constant A is chosen to be 256 in case the slack variable a is chosen to be an 8-bit variable.

Additionally or alternatively, an exclusivity of each operational mode of each mobile application may be taken into account as the at least one equality constraint. Mathematically speaking, the term $$\left(\Sigma_j x_{ij} - 1\right)^2$$

vanishes for each application i forcing the application i to be in a single operational mode j at any time. The exclusivity constraint is also squared in order to ensure a positive contribution both in case application i is in more than one operational mode is active and in case application i is in less than one operational mode.

Preferably, determining the minimum comprises transforming the overall cost function into a Lagrange function by multiplying each equality constraint with a Lagrange multiplier and adding each multiplied equality constraint to the overall cost function. Accordingly, the Lagrange function is an objective function or a target function of the optimization problem comprising the overall cost function and the at least one equality constraint and the time-dependent minimum of the Lagrange function reads $$\min\left(\Sigma_i \Sigma_j C_{ij} x_{ij} + \gamma \Sigma_i \left(\Sigma_j x_{ij} - 1\right)^2 + \right.$$

$$\delta\left(\sum_i\sum_j C_{ij}x_{ij} + \frac{C_{max}}{A}\sum_k 2^k a_k - C_{max}\right)^2.$$

Transforming the overall cost function into the Lagrange function advantageously comprises converting the Lagrange function into a quadratic unconstrained binary optimization (QUBO) format. The QUBO format requires the quadratic and linear Qbit terms to be separated from each other which may be achieved by the following conversions.

The term comprising the exclusivity constraint may be transformed into the QUBO format using the second Binomian formula $$\Sigma_i(\Sigma_j x_{ij}-1)^2 = \Sigma_i((\Sigma_j x_{ij})^2 - 2\Sigma_j x_{ij}+1).$$

Applying the distributive law on the first term thereof $$\left(\sum_j x_{ij}\right)^2 = \sum_j x_{ij}^2 + 2\sum_j\sum_{k>j} x_{ik}x_{kj}$$

and using the fact $$x_{ij}^2 = x_{ij},$$

which generally holds for binary variables, finally yields $$\Sigma_i(\Sigma_j x_{ij}-1)^2 = \Sigma_i(\Sigma_j x_{ij} - 2\Sigma_j x_{ij} + 2\Sigma_j\Sigma_{k>j} x_{ik}x_{kj}).$$

The term comprising the spectral capacity constraint may be transformed into the QUBO format using the distributive law $$\left(\sum_i\sum_j C_{ij}x_{ij} + \frac{C_{max}}{A}\sum_k 2^k a_k - C_{max}\right)^2 = \left(\sum_i\sum_j C_{ij}x_{ij}\right)^2 +$$

$$\left(\frac{C_{max}}{A}\right)^2\left(\sum_k 2^k a_k\right)^2 + C_{max}^2 + \frac{C_{max}}{2A}\left(\sum_i\sum_j C_{ij}x_{ij}\right)\left(\sum_k 2^k a_k\right) -$$

$$2C_{max}\left(\sum_i\sum_j C_{ij}x_{ij} + \frac{C_{max}}{A}\sum_k 2^k a_k\right)$$

The first term may be written as $$(\Sigma_i\Sigma_j C_{ij}x_{ij})^2 = \Sigma_i\Sigma_j\Sigma_l\Sigma_m C_{ij}C_{lm}x_{ij}x_{lm},$$

wherein the terms $x_{ij}x_{lm}$ are quadratic for $i\neq l$ or $j\neq k$ and linear for $i=l$, $j=k$ due to $x_{ij}^2 = x_{ij}$.

The second term may be written as $$\left(\frac{C_{max}}{A}\right)^2\left(\sum_k 2^k a_k\right)^2 = \left(\frac{C_{max}}{A}\right)^2\left(\sum_k 2^{2k} a_k + 2\sum_k\sum_{z>k} 2^k 2^z a_k a_z\right),$$

where again the identity $a_k^2 = a_k$ for binary variables is used.

The third term may be written as $$\frac{C_{max}}{2A}\left(\sum_i\sum_j C_{ij}x_{ij}\right)\left(\sum_k 2^k a_k\right) = \frac{C_{max}}{2A}\left(\sum_i\sum_j\sum_k C_{ij}2^k x_{ij}a_k\right).$$

The term $C_{max}^2$ may be readily omitted as a constant does not affect solutions of the optimization problem.

With these transformations the QUBO format of the Lagrange function reads $$\sum_i\sum_j C_{ij}x_{ij} + \gamma\sum_i\left(\sum_j x_{ij} - 2\sum_j x_{ij} + 2\sum_j\sum_{k>j} x_{ik}x_{kj}\right)^2 +$$

$$\delta\left(\sum_i\sum_j\sum_l\sum_m C_{ij}C_{lm}x_{ij}x_{lm} +\right.$$

$$\left(\frac{C_{max}}{A}\right)^2\left(\sum_k 2^{2k} a_k + 2\sum_k\sum_{z>k} 2^k 2^z a_k a_z\right)\right) +$$

$$\delta\left(\frac{C_{max}}{2A}\left(\sum_i\sum_j\sum_k C_{ij}2^k x_{ij}a_k\right) - 2C_{max}\left(\sum_i\sum_j C_{ij}x_{ij} + \frac{C_{max}}{A}\sum_k 2^k a_k\right)\right)$$

In many embodiments, the optimization service transforms the overall cost function into the Lagrange function and/or converts the Lagrange function into the quadratic unconstrained binary optimization form. The optimization service relieves the scheduler from creating the Lagrange function or the QUBO form thereof. The scheduler may only provide the optimization service with the cost values $C_{ij}$ of the applications i being connected to the radio cell and the cost value $C_{max}$ of the spectral capacity of the radio cell.

In another embodiment, an optimizer being controlled by the optimization service minimizes the overall cost function, the optimizer being chosen from an adiabatic quantum computer, a universal quantum computer, a traditional computer configured for simulating a quantum annealing and a traditional computer configured for executing a traditional optimization algorithm and being different from the optimization service. The optimizer is separated from the optimization service and may be located remote from the optimization service. The high-performance quantum computers may require very special operation conditions like a low temperature, a deep vacuum and the like. Apart from that, they may be too expensive for operating as a dedicated scheduling optimizer. A quantum computer is usually located centrally and collectively used by a plurality of optimization services.

Advantageously, the scheduler and the optimization service communicate via a REST interface or an XML interface and/or the optimization service and the optimizer communicate via a REST interface or an XML interface. The REST (REpresentional State Transfer) interface is standardized and easy to implement and allows for an economic development of the scheduler and the optimization service. The optimization service may communicate with the scheduler and/or the optimizer also via a standardized IT communication interface being different from the REST interface and the XML interface.

The optimization service may be requested by the scheduler every few seconds. A high frequency of requests enables the scheduler to adapt the allocated spectral resources near-time to the very volatile requirements of the mobile applications being connected to the radio cell. The optimization service may be requested by a plurality of schedulers.

The overall time for having the optimization problem solved comprises the time used by the optimization service for calculating the overall cost function (about 125,000 matrix elements for 100 mobile applications and 5 operating modes) and any transformation, the time used by the optimizer for minimization and the times used by transmissions between the scheduler, the optimization service and the optimizer. For reducing the transmission time between the optimization service and the optimizer the optimizer may also be located close to the optimization service.

Preferably, the optimization service is executed by an edge cloud server located at the radio access point. The edge cloud server ensures short transmission times for the communication between the scheduler and the optimization service and avoids round trip times (RTT) of the mobile communication network. The short transmission times increase an efficiency of the optimal allocation of spectral resources. Alternatively the optimization service may be executed by a cloud server which is not located at the edge of the radio access network or a cloud server being part of a customer's infrastructure.

A second aspect of the invention is an edge cloud server which provides an optimization service. The optimization service determines a solution of an optimization problem upon a request. The second aspect also comprises a cloud server which is not located at the edge of the radio access network or a cloud server being part of a customer's infrastructure.

According to the invention the optimization service is configured for participating in an inventive method. The optimization service provides a scheduler of a mobile communication network with optimized configuration data as a solution of an optimization problem for allocating a spectral resource to a mobile application being connected to a radio cell of the mobile communication network.

A third aspect of the invention is a computer program product, comprising a computer readable storage medium storing a program code, the program code being executable by an edge cloud server. The computer program product may be a CD, a DVD, a USB stick or the like. The computer program product may also be a memory chip, a hard drive, a cloud server, a repository, an image, a file share and the like. The program code stored on the computer program product may be executable by the control unit of the vehicle or the edge data center immediately or after having been installed therein, respectively.

According to the invention, the program code causes the edge cloud server to participate in an inventive method when being executed by a processor of the edge cloud server. The edge cloud server allows a scheduler of a mobile communication network for allocating optimal spectral resources to mobile applications being connected to application backends via a radio access point of a radio cell of a mobile communication network.

It is an advantage of exemplary embodiments of the invention that an optimization problem is solvable near-time, i.e. within a few milliseconds to a few seconds. Accordingly, a scheduler of a mobile communication network may optimally allocate spectral resources of a radio cell of a mobile communication network to a plurality of mobile applications being connected to an application backend via a radio access point of the radio cell near-time, i.e. every few seconds or less.

Further advantages and configurations of the invention become apparent from the following description and the enclosed drawing.

It shall be understood that the features described previously and to be described subsequently may be used not only in the indicated combinations but also in different combinations or on their own without departing from the scope of the present invention.

The invention is described in detail via exemplary embodiments and with reference to the drawing.

FIG. 1 schematically shows a system comprising an edge cloud server 50 according to an embodiment of the invention. The edge cloud server 50 is located at a radio access point 40 and comprises and executes a plurality of application backends 51, 52, 53. Each application backend 51, 52, 53 specifies a plurality of possible operational modes 12, 22, 32, each operational mode 12, 22, 32 comprising a combination of a minimum data rate 42 and a maximum latency 43.

The edge cloud server 50 further comprises and executes an optimization service 54. The optimization service 54 is configured for participating in a method described below and may be provided by a computer program product comprising a computer readable storage medium storing a program code. The program code is executable by the edge cloud server 50 and causes the edge cloud server 50 to participate in the method described below when being executed by a processor of the edge cloud server 50.

The system also comprises the radio access point 40, e.g. an LTE base station or a 4G/5G nodeB, of a radio cell of a mobile communication network. The radio access point 40 comprises and executes a scheduler 41.

Furthermore, the system comprises an optimizer 60 which is separate from the optimization service 54 and may be located remote from the edge cloud server 50. In an alternative embodiment, the optimizer may also be located close to the optimization service in order to reduce a transmission time between the optimization service 54 and the optimizer 60. The optimizer 60 is chosen to be an adiabatic quantum computer, but may be alternatively chosen to be a universal quantum computer, a traditional computer configured for simulating a quantum annealing or a traditional computer configured for executing a traditional optimization algorithm in other embodiments.

A plurality of mobile devices 10, 20, 30, e.g. smartphones, each comprising and executing a mobile application 11, 21, 31 are also part of the system. Each mobile application 11, 21, 31 specifies a plurality of possible operational modes 12, 22, 32 each operational mode 12 comprising a combination of a minimum data rate 42 and a maximum latency 43. It is noted that the operational modes 12, 22, 32 of the mobile applications 11, 21, 31 correspond to the operational modes 12, 22, 32 of the application backends 51, 52, 53, respectively, as do the applications 11, 21, 31 with respect to the application backends 51, 52, 53.

During a normal operation of the system a method for allocating a spectral resource 42, 43 of the radio cell of the mobile communication network to a mobile application 11, 21, 31 is carried out as follows, the method comprising the following steps:

A mobile application 11, 21, 31 establishes a wireless connection 13, 23, 33 to an application backend 51, 52, 53 via the radio access point 40 of the radio cell of the mobile communication network.

The scheduler 41 of the mobile communication network allocates a spectral resource 42, 43 of the radio cell to the established wireless connection 13, 23, 33. A minimum data rate 42 and/or a maximum latency 43, preferably a predefined combination of a minimum data rate 42 and a maximum latency 43 may be allocated as the spectral resource 42, 43.

The scheduler 41 allocates the spectral resource 42, 43 depending on a determined minimum of an overall cost function of the radio cell, the overall cost function summing a plurality of cost values each cost value being related to a mobile application 11, 21, 31 being connected to the radio access point 40. The scheduler 41 determines the cost values depending on the respective actual operational modes 12, 22, 32 of the mobile applications 11, 21, 31.

Determining the minimum may comprise taking into account at least one equality constraint. Preferably, a spectral capacity of the radio cell and/or an exclusivity of each operational mode 12, 22, 32 of each mobile application 11, 21, 31 is taken into account as the at least one equality constraint.

Determining the minimum may further comprise transforming the overall cost function into a Lagrange function by multiplying each equality constraint with a Lagrange multiplier and adding each multiplied equality constraint to the overall cost function. Transforming the overall cost function into the Lagrange function preferably comprises converting the Lagrange function into a quadratic unconstrained binary optimization (QUBO) format.

The optimization service 54 may transform the overall cost function into the Lagrange function and/or convert the Lagrange function into the quadratic unconstrained binary optimization form. The optimizer 60 being controlled by the optimization service 54 minimizes the overall cost function and transmits the minimum, i.e. a bit sequence comprising a plurality of 0s and 1s, to the optimization service 54. The optimization service 54 may transform the received minimum into operating modes, i.e. service qualities to be assigned to or spectral resources to be allocated to the mobile applications, and transmit the operating modes to the scheduler 41.

The optimization service 54 is executed by the edge cloud server 50. The optimization service 54 is requested by the scheduler 41 every few seconds and determines a minimum of the overall cost function.

The scheduler 41 and the optimization service 54 may communicate via a REST (REpresentional State Transfer) interface and/or the optimization service 54 and the optimizer 60 may communicate via a REST interface. The optimization service 54 may communicate with the scheduler 41 and/or the optimizer 60 via an XML interface or a standardized IT communication interface being different from the REST interface and the XML interface.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 10 mobile device
11 mobile application
12 operational mode
13 wireless connection
20 mobile device
21 mobile application
22 operational mode
23 wireless connection
30 mobile device
31 mobile application
32 operational mode
33 wireless connection
40 radio access point
41 scheduler
42 minimum data rate
43 maximum latency
50 edge cloud server
51 application backend
52 application backend
53 application backend
54 optimization service
60 optimizer

The invention claimed is:

1. A method for allocating a spectral resource of a radio cell of a mobile communication network to a mobile application, comprising:
    establishing, by the mobile application, a wireless connection to an application backend via a radio access point of the radio cell of the mobile communication network; and
    allocating, by a scheduler of the mobile communication network, the spectral resource of the radio cell to the established wireless connection;
    wherein an optimization service requested by the scheduler determines a minimum of an overall cost function, the overall cost function summing a plurality of cost values, wherein each cost value is related to a respective mobile application connected to the radio access point;
    wherein the scheduler allocates the spectral resource depending on the determined minimum of the overall cost function.

2. The method according to claim 1, wherein a minimum data rate and/or a maximum latency for uplink and downlink, respectively, are allocated as the spectral resource.

3. The method according to claim 1, wherein a predefined combination of a minimum data rate and a maximum latency for uplink and downlink, respectively, is allocated as the spectral resource.

4. The method according to claim 1, wherein determining the minimum takes into account at least one equality constraint.

5. The method according to claim 4, wherein taking into account the at least one equality constraint comprises taking into account a spectral capacity of the radio cell.

6. The method according to claim 4, wherein taking into account the at least one equality constraint comprises taking into account an exclusivity of each operational mode of each of a plurality of mobile applications.

7. The method according to claim 4, wherein determining the minimum comprises transforming the overall cost function into a Lagrange function by multiplying each equality constraint with a Lagrange multiplier and adding each multiplied equality constraint to the overall cost function.

8. The method according to claim 7, wherein transforming the overall cost function into the Lagrange function comprises converting the Lagrange function into a quadratic unconstrained binary optimization (QUBO) format.

9. The method according to claim 7, wherein the optimization service transforms the overall cost function into the Lagrange function and/or converts the Lagrange function into a quadratic unconstrained binary optimization (QUBO) format.

10. The method according to claim 1, wherein an optimizer controlled by the optimization service minimizes the overall cost function, wherein the optimizer is an adiabatic quantum computer, a universal quantum computer, a computer configured for simulating a quantum annealing, or a computer configured for executing an optimization algorithm.

11. The method according to claim 10, wherein the scheduler and the optimization service communicate via a REST interface or an XML interface; and/or
wherein the optimization service and the optimizer communicate via a REST interface or an XML interface.

12. The method according to claim 1, wherein the optimization service is requested by the scheduler periodically.

13. The method according to claim 1, wherein the optimization service is executed by an edge cloud server located at the radio access point.

14. A system, comprising:
a mobile application configured to establish a wireless connection to an application backend via a radio access point of a radio cell of a mobile communication network;
a scheduler of the mobile communication network configured to allocate a spectral resource of the radio cell to the established wireless connection; and
an edge cloud server configured to provide an optimization service requested by the scheduler, wherein the optimization service determines a minimum of an overall cost function, the overall cost function summing a plurality of cost values, wherein each cost value is related to a respective mobile application connected to the radio access point;
wherein the scheduler is configured to allocate the spectral resource depending on the determined minimum of the overall cost function.

15. One or more non-transitory computer-readable storage mediums having processor-executable instructions stored thereon, wherein the processor-executable instructions, when executed, facilitate:
establishing, by a mobile application, a wireless connection to an application backend via a radio access point of a radio cell of a mobile communication network;
allocating, by a scheduler of the mobile communication network, a spectral resource of the radio cell to the established wireless connection; and
providing, by an edge cloud server, an optimization service requested by the scheduler, wherein the optimization service determines a minimum of an overall cost function, the overall cost function summing a plurality of cost values, wherein each cost value is related to a respective mobile application connected to the radio access point;
wherein allocating the spectral resource is based on the determined minimum of the overall cost function.

\* \* \* \* \*